(12) United States Patent
Mukamoto et al.

(10) Patent No.: US 12,445,370 B2
(45) Date of Patent: Oct. 14, 2025

(54) WIRELESS COMMUNICATION SYSTEM, WIRELESS COMMUNICATION DEVICE, WIRELESS COMMUNICATION METHOD, AND COMPUTER PROGRAM PRODUCT FOR WIRELESS COMMUNICATION

(71) Applicant: KABUSHIKI KAISHA TOSHIBA, Tokyo (JP)

(72) Inventors: Masaki Mukamoto, Kawasaki Kanagawa (JP); Yasuyuki Tanaka, Kawasaki Kanagawa (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 283 days.

(21) Appl. No.: 18/175,429

(22) Filed: Feb. 27, 2023

(65) Prior Publication Data
US 2024/0007391 A1 Jan. 4, 2024

(30) Foreign Application Priority Data
Jul. 1, 2022 (JP) .................................. 2022-106773

(51) Int. Cl.
*H04L 45/00* (2022.01)
*H04W 28/02* (2009.01)
*H04W 84/18* (2009.01)

(52) U.S. Cl.
CPC ............. *H04L 45/20* (2013.01); *H04L 45/32* (2013.01); *H04W 28/0289* (2013.01); *H04W 84/18* (2013.01)

(58) Field of Classification Search
None
See application file for complete search history.

(56) References Cited

U.S. PATENT DOCUMENTS 11,153,803 B2  10/2021 Larmo et al.
11,272,421 B2   3/2022 Iwata
(Continued)

FOREIGN PATENT DOCUMENTS

JP  2013-207428 A  10/2013
JP  2015-65625 A   4/2015
(Continued)

OTHER PUBLICATIONS

Bluetooth SIG, "Bluetooth Specification: Mesh Profile, v1.0.1," 333 pages (2019).
(Continued)

*Primary Examiner* — Anh Ngoc M Nguyen
(74) *Attorney, Agent, or Firm* — Finnegan, Henderson, Farabow, Garrett & Dunner, LLP

(57) ABSTRACT

According to one embodiment, a wireless communication system includes first and second wireless communication devices, each constituting a wireless multihop mesh network. The first wireless communication device includes a hardware processor that registers a setting-purpose TTL in management information on the basis of an inspection packet received from the second wireless communication device. The inspection packet includes second identification information of the second wireless communication device, a TTL initial value, and a TTL. The setting-purpose TTL corresponds to difference between the TTL initial value and the TTL included in the inspection packet. The setting-purpose TTL is registered to have correspondence with the second identification information. The hardware processor sets the setting-purpose TTL as a TTL of a packet addressed to the second wireless communication device identified by the second identification information and transmits the packet. The setting-purpose TTL corresponds to the second identification information.

8 Claims, 11 Drawing Sheets

(56) References Cited

U.S. PATENT DOCUMENTS

| | | | |
|---|---|---|---|
| 2016/0094569 A1* | 3/2016 | Mondiguing | H04L 63/1416 |
| | | | 726/24 |
| 2017/0117978 A1* | 4/2017 | Ko | H04L 45/32 |
| 2018/0152375 A1* | 5/2018 | Li | H04L 67/56 |
| 2021/0377980 A1 | 12/2021 | Fujishiro et al. | |
| 2022/0150758 A1 | 5/2022 | Zotti et al. | |

FOREIGN PATENT DOCUMENTS

| | | |
|---|---|---|
| JP | 6345561 B2 | 6/2018 |
| JP | 2018-191183 A | 11/2018 |
| JP | 2020-87258 A | 6/2020 |
| JP | 2022-17555 A | 1/2022 |
| JP | 7045451 B2 | 3/2022 |
| JP | 2022-522537 A | 4/2022 |
| WO | WO 2018/207411 A1 | 11/2018 |
| WO | WO 2019/059386 A1 | 3/2019 |

OTHER PUBLICATIONS

Japan Patent Office, Office Action in JP App. No. 2022-106773 (Jul. 29, 2025).

* cited by examiner

FIG.3

INSPECTION PACKET

| SOURCE INFORMATION | DESTINATION INFORMATION | TTL | DATA | | | |
|---|---|---|---|---|---|---|
| | | | TTL INITIAL VALUE | | | |

FIG.4

PACKET

| SOURCE INFORMATION | DESTINATION INFORMATION | TTL | DATA |
|---|---|---|---|

INSPECTION PACKET

| SOURCE INFORMATION | DESTINATION INFORMATION | TTL | DATA | | |
|---|---|---|---|---|---|
| | | | TTL INITIAL VALUE | TTL CORRECTION VALUE | |

MANAGEMENT INFORMATION

| GWID | SETTING-PURPOSE TTL | TTL INITIAL VALUE |
|---|---|---|

INSPECTION PACKET

| SOURCE INFORMATION | DESTINATION INFORMATION | TTL | DATA | |
|---|---|---|---|---|
| | | | TTL INITIAL VALUE | TRANSMISSION LOCATION INFORMATION |

MANAGEMENT INFORMATION

| GWID | SETTING-PURPOSE TTL | TTL INITIAL VALUE | TRANSMISSION LOCATION INFORMATION |
|---|---|---|---|

SCHEDULE INFORMATION

| GWID | LOCATION INFORMATION | |
|---|---|---|
| | TIMING INFORMATION | POSITION INFORMATION |

WIRELESS COMMUNICATION SYSTEM, WIRELESS COMMUNICATION DEVICE, WIRELESS COMMUNICATION METHOD, AND COMPUTER PROGRAM PRODUCT FOR WIRELESS COMMUNICATION

CROSS-REFERENCE TO RELATED APPLICATIONS

This application is based upon and claims the benefit of priority from Japanese Patent Application No. 2022-106773, filed on Jul. 1, 2022; the entire contents of which are incorporated herein by reference.

FIELD

Embodiments described herein relate generally to a wireless communication system, a wireless communication device, a wireless communication method, and a computer program product.

BACKGROUND

A technology called flooding communication is known as one of the technologies for implementing a wireless multihop mesh network. In the flooding communication technology, each of a plurality of nodes constituting a wireless multihop mesh network transmits packets to all other nodes, which represent the destinations, within its communication range. As a result of implementing the flooding communication technology, it becomes possible to perform robust communication. However, in the flooding communication technology, since the packets are transmitted to all surrounding nodes that also include the nodes making a significant detour to the destination, there are times when the packets get excessively replicated thereby causing congestion in the network.

As a technology for avoiding congestion, a method has been proposed in which each node decides on the packet transmission count based on the success rate of end-to-end communication.

However, this technology is intended to secure redundancy according to the packet loss ratio, and is less effective against the problem of packet transmission via unnecessary routes. Moreover, a method has been proposed in which all nodes in a network periodically send a monitoring packet. In this technology, it has been disclosed that each node that receives a monitoring packet sets the TTL (Time To Live) with respect to the source node according to the monitoring packet. However, in this technology, since all nodes in a network periodically send monitoring packets, sometimes there is excessive transfer attributed to the monitoring packets. That is, as far as the related arts are concerned, in the case of using the flooding communication technology in a wireless multihop mesh network, there are times when unnecessarily packet transfer gets carried out.

BRIEF DESCRIPTION OF THE DRAWINGS

FIG. 3 is a schematic diagram illustrating a format of an inspection packet that is broadcast;

FIG. 4 is a schematic diagram illustrating a format of a packet;

FIG. 7 is a schematic diagram illustrating a data configuration of management information;

FIG. 15 is a schematic diagram illustrating a data configuration of management information;

FIG. 16 is a schematic diagram illustrating a data configuration of schedule information.

DETAILED DESCRIPTION

Figure 1:
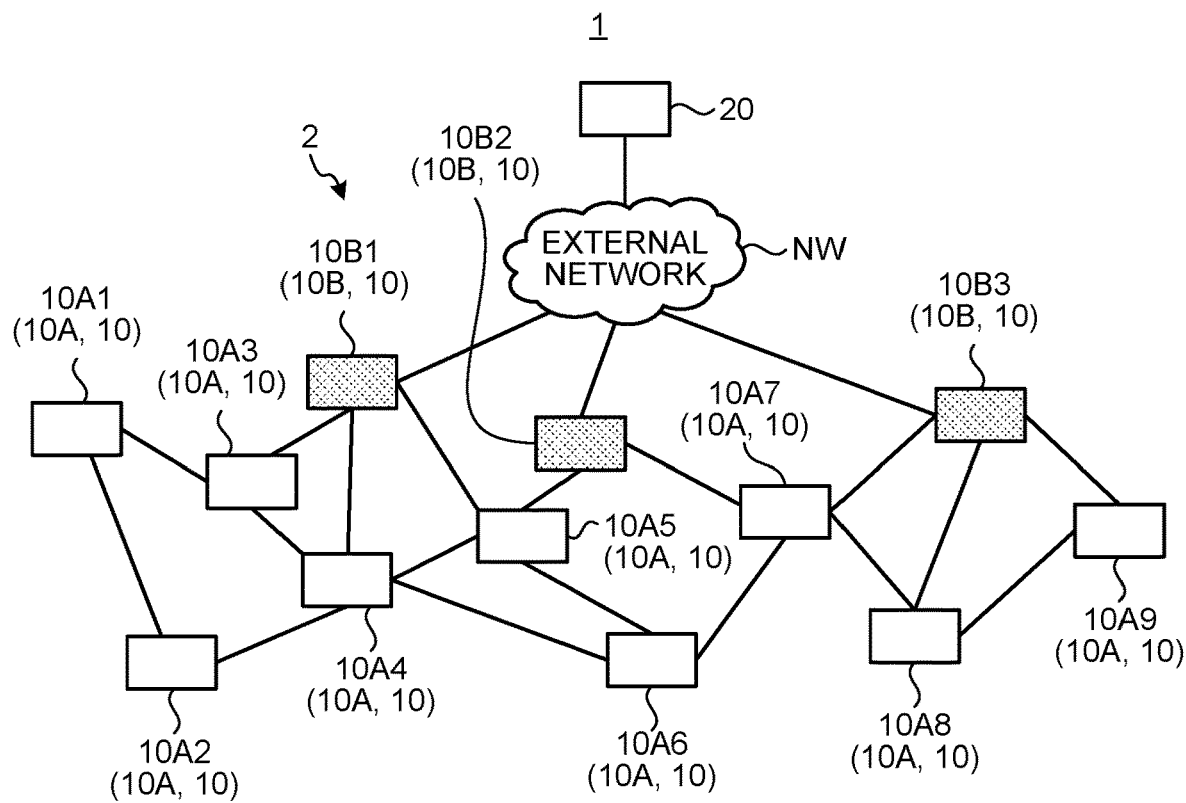
FIG. 1 is a schematic diagram illustrating a wireless communication system.

A wireless communication system according to an embodiment includes a first wireless communication device and a second wireless communication device. The first wireless communication device constitutes a wireless multihop mesh network and performing flooding communication. The second wireless communication device constitutes the wireless multihop mesh network and being capable of communicating with an external network. The first wireless communication device includes one or more hardware processors coupled to a memory. The one or more hardware processors are configured to register a setting-purpose TTL in management information on the basis of an inspection packet received from the second wireless communication device. The inspection packet includes second identification information of the second wireless communication device, a TTL (Time To Live) initial value, and a TTL. The setting-purpose TTL corresponds to difference between the TTL initial value and the TTL included in the inspection packet. The setting-purpose TTL is registered to have correspondence with the second identification information. The one or more hardware processors are configured to set the setting-purpose TTL as a TTL of a packet addressed to the second wireless communication device identified by the second identification information. The setting-purpose TTL corresponds to the second identification information in the management information. The one or more hardware processors are configured to transmit the packet for which the setting-purpose TTL has been set as the TTL.

Exemplary embodiments of a wireless communication system, a wireless communication device, a wireless communication method, and a computer program product will be explained below in detail with reference to the accompanying drawings.

In the following explanation of the embodiments, the portions referred to by the same reference numerals have practically identical functions, and the explanation regarding the identical portions is not repeatedly given.

First Embodiment

FIG. 1 is a schematic diagram illustrating an example of a wireless communication system 1 according to a first embodiment.

The wireless communication system 1 includes a plurality of nodes 10 capable of performing wireless communication; an external network NW; and a server device 20 that is connected to the external network NW. Herein, the server device 20 is an information processing device connected to the external network NW. Meanwhile, the wireless communication system 1 can be configured also without including the server device 20.

The nodes 10 represent an example of wireless communication devices. A plurality of nodes 10 constitutes a wireless multihop mesh network 2. In FIG. 1, as an example, there are 12 nodes 10 constituting the wireless multihop mesh network 2. However, the number of nodes 10 constituting the wireless multihop mesh network 2 is not limited to 12.

Each of a plurality of nodes 10 constituting the wireless multihop mesh network 2 is equipped with the flooding communication function. Due to the flooding communication function, at the time of performing multihop communication, each node performs transmission by selecting all other nodes 10 within its communication range as the destinations or the transfer destinations.

In the first embodiment, it is assumed that all transmission and all transfer performed by the nodes 10 is in the form of flooding communication. That is, in the following explanation, transmission implies flooding-communication-based transmission and transfer implies flooding-communication-based transfer.

The wireless communication system 1 includes first nodes 10A and GW (gateway) nodes 10B as the nodes 10. The first nodes 10A represent an example of first wireless communication devices. The GW nodes 10B represent second wireless communication devices.

The first nodes 10A represent the nodes 10 that constitute the wireless multihop mesh network 2 and that perform flooding communication. Moreover, the first nodes 10A are not equipped with the function for communicating with the external network NW.

In the first embodiment, the explanation is given about an example that the wireless multihop mesh network 2 includes nine first nodes 10A (a first node 10A1 to a first node 10A9). However, as long as a plurality of first nodes 10A constitutes the wireless multihop mesh network 2, the number of first nodes 10A is not limited to nine.

The GW nodes 10B represent the nodes 10 that constitute the wireless multihop mesh network 2 and that perform flooding communication in an identical manner to the first nodes 10A. Moreover, the GW nodes 10B are capable of communicating with the external network NW, and function as routers that establish connection with the external network NW. More particularly, the GW nodes 10B function as gateways or concentrators.

In the first embodiment, the explanation is given about an example that the wireless multihop mesh network 2 includes three GW nodes 10B (a GW node 10B1 to a GW node 10B3). However, as long as one or more GW nodes 10B are included in the wireless multihop mesh network 2, the number of GW nodes 10B is not limited to three. Moreover, in the first embodiment, it is assumed that each of a plurality of GW nodes is immovably fixed at a position in the wireless multihop mesh network 2.

In the first embodiment, the explanation is given about an example that Bluetooth (registered trademark) Mesh explained in Non-patent Literature 1 is used as the standard specification for the wireless multihop mesh network 2.

Non-patent Literature 1: Bluetooth Mesh profile 1.0.1 (https://www.bluetooth.com/ja-jp/specifications/specs/mesh-profile-1-0-1/)

In Bluetooth Mesh, the TTL (Time To Live) is specified that indicates the transferable count for the packets that are transmitted or transferred in the wireless multihop mesh network 2. When any node 10 receives a packet, it performs a transfer operation in which, if the TTL is equal to or larger than "1", the packet having the TTL decremented by "1" is transferred to the other nodes 10; and, if the TTL is equal to "0", the packet is not transferred and is destroyed.

In the first embodiment, each of a plurality of first nodes 10A constituting the wireless multihop mesh network 2 transmits packets mainly to the GW nodes 10B as the destination nodes.

When data to be transmitted is generated in any of a plurality of first nodes the concerned first node 10A transmits packets. Moreover, when packets not addressed to a particular first node 10A are received therein from some other first node then that particular first node 10A transfers the received packets. The packets that are transmitted or transferred from each first node 10A are received in the form of flooding communication by all other nodes 10 that are present within the communication range of the concerned first node 10A. At the time of transferring a packet, each node 10 confirms the TTL specified in the packet and then performs the transfer operation.

Given below is the explanation of a functional configuration of the GW nodes according to the first embodiment.

Figure 2:
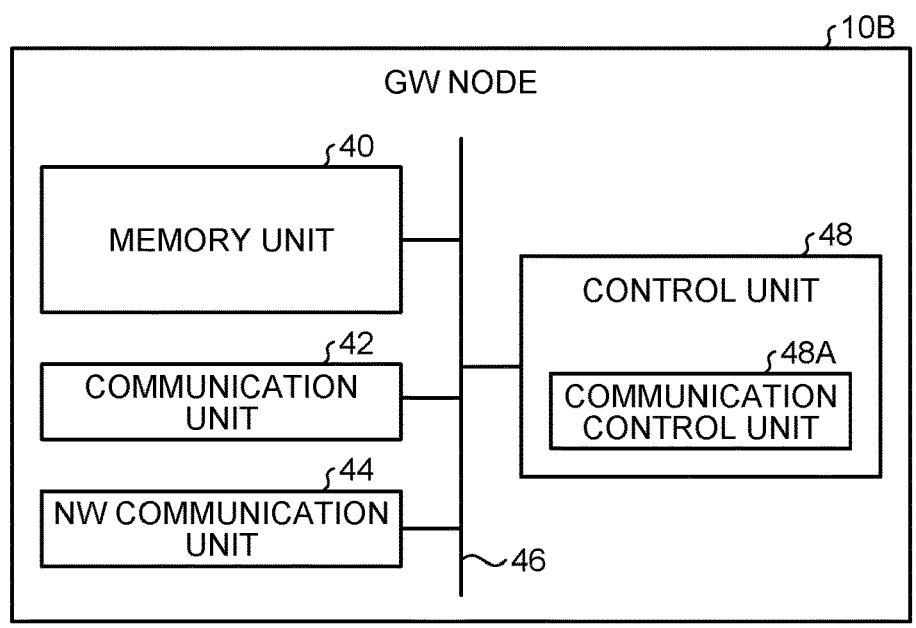
FIG. 2 is a schematic diagram illustrating a functional configuration of a GW node.

FIG. 2 is a schematic diagram illustrating an exemplary functional configuration of the GW node 10B.

The GW node 10B includes a memory unit 40, a communication unit 42, a network (NW) communication unit 44, and a control unit 48. The memory unit 40, the communication unit 42, the NW communication unit 44, and the control unit 48 are communicably connected to each other by a bus 46.

The memory unit 40 is used to store a variety of data. The communication unit 42 is a function unit for transmitting packets to and receiving packets from other nodes present in the wireless multihop mesh network 2. The NW communication unit 44 is a function unit for transmitting data to and receiving data from the server device 20 via the external network NW.

The control unit 48 includes a communication control unit 48A that is implemented using, for example, one or more processors. For example, the constituent elements of the control unit 48 can be implemented by causing a processor such as a central processing unit (CPU) to execute computer programs, that is, can be implemented using a software. Alternatively, the constituent elements can be implemented using a dedicated IC, that is, can be implemented using hardware. Still alternatively, the constituent elements can be implemented using a combination of software and hardware. In the case of using a plurality of processors, each processor can implement one of the constituent elements or two or more of the constituent elements.

The communication control unit 48A performs control to send inspection packets to the first nodes 10A included in the wireless multihop mesh network 2.

The inspection packets represent the packets transmitted from the GW nodes 10B toward the first nodes 10A constituting the wireless multihop mesh network 2.

The communication control unit 48A broadcasts, at regular intervals, the inspection packets that include information representing broadcasting as the destination information.

FIG. 3 is a schematic diagram illustrating an exemplary format of an inspection packet that is broadcast. An inspection packet includes source information, destination information, the TTL, and data. The source information indicates the source of transmission of the inspection packet. Since the inspection packets are transmitted from the GW nodes 10B, the source information of an inspection packet has a GWID set therein as the identification information of the GW node 10B that transmitted the inspection packet. The GWID represents an example of second identification information.

The destination information indicates the destination of the inspection packet. More particularly, in the destination information, information indicating broadcasting is set, or information indicating unicasting to a particular node 10 and identification information of that particular node 10 is set. In the destination information included in the inspection packet that is broadcast by the communication control unit 48A at regular intervals, information indicating broadcasting is set.

As explained above, the TTL represents a value indicating the transferable count. That is, every time a transfer is performed by any first node 10A, the TTL gets decremented by "1".

In the data field included in an inspection packet, the TTL initial value is specified. The TTL initial value represents the initial value of the TTL. The TTL initial value can be a value that enables transferring the inspection packet to all first nodes 10A constituting the wireless multihop mesh network 2.

Returning to the explanation with reference to FIG. 2, the communication control unit 48A broadcasts, at regular intervals, an inspection packet as illustrated in FIG. 3. That is, the GW node 10B broadcasts, at regular intervals, an inspection packet in which: the GWID of the concerned GW node 10B is set as the source information; information indicating broadcasting is set as the destination information; and the TTL and the TTL initial value are set.

Herein, the regular interval can be set in advance according to the configuration of the wireless multihop mesh network 2. Moreover, the regular interval can be set to be variable according to an operation instruction issued by the user.

When a packet is received from any first node 10A included in the wireless multihop mesh network 2, the communication control unit 48A performs the following operations. More specifically, the communication control unit 48A determines whether or not the TTL specified in the packet, which is received from one first node 10A, is equal to or larger than a second threshold value. If the TTL is equal to larger than the second threshold value, then the communication control unit 48A unicasts an inspection packet, which includes the TTL as a TTL correction value and which includes destination information indicating the first node 10A as a transmission source and information indicting unicasting, to the concerned first node 10A.

FIG. 4 is a schematic diagram illustrating an exemplary format of a packet. A packet includes source information, destination information, the TTL, and data. The source information indicates the source of transmission of the packet. The destination information indicates the destination of the packet. As explained earlier, in the first embodiment, the first nodes 10A included in the wireless multihop mesh network 2 send packets mainly to the GW nodes 10B representing the destinations. Hence, in the source information included in a packet, the identification information of the concerned first node 10A is set. Moreover, in the destination information included in a packet, the GWID of one of the GW nodes 10B, which are included in the wireless multihop mesh network 2, is set. The TTL is same as the explanation given earlier.

Returning to the explanation with reference to FIG. 2, the communication control unit 48A determines whether or not the TTL specified in the packet, which is received from one first node 10A, is equal to or larger than the second threshold value.

The second threshold value can be set as the threshold value to be used in determining whether or not it is necessary to vary the value of the setting-purpose TTL of the concerned GW node 10B. Regarding the setting-purpose TTL, the detailed explanation is given later. For example, the communication control unit 48A can set the second threshold value in advance according to: the network topology of the wireless multihop mesh network 2; the communication success rate of the wireless multihop mesh network 2; and the ease in the connectivity of the wireless multihop mesh network 2. More specifically, the communication control unit 48A sets a high second threshold value in proportion to a high communication success rate or in proportion to the ease in the connectivity of the wireless multihop mesh network 2. That is, the communication control unit 48A sets a low second threshold value in proportion to the difficulty in the connectivity or in proportion to a low communication success rate. With that, in the concerned first node 10A, the value of the setting-purpose TTL can be made more easily variable.

If the TTL specified in the packet received from the first node 10A is equal to or larger than the second threshold value, then the communication control unit 48A treats the TTL specified in the packet as the TTL correction value, and generates an inspection packet in which the TTL correction value is specified in the data field. Moreover, the communication control unit 48A sets, as the destination information for the inspection packet, the identification information of the first node 10A specified in the source information of the concerned packet and sets information indicating unicasting. Then, the communication control unit 48A unicasts the inspection packet, which is generated and set as explained above, to the concerned first node 10A.

Figures 5, 6:
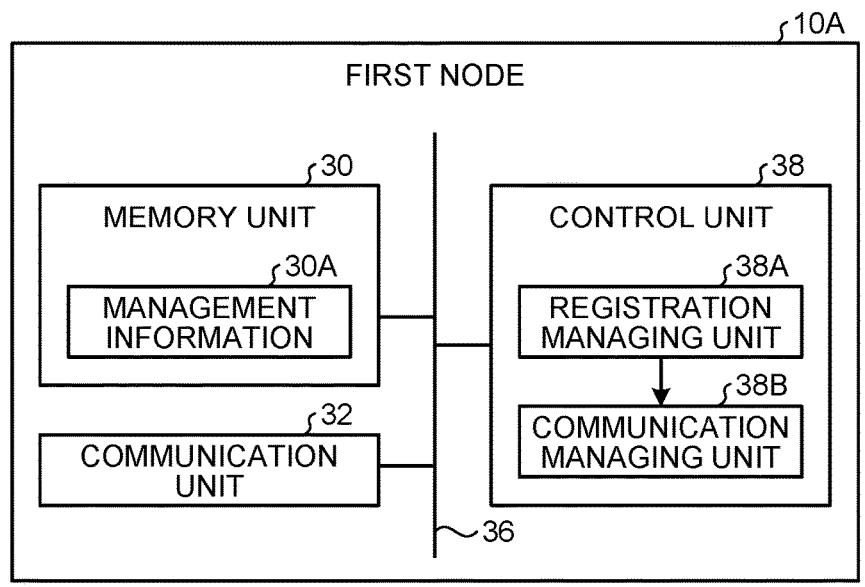
FIG. 5 is a schematic diagram illustrating a format of an inspection packet that is unicast.
FIG. 6 is a schematic diagram illustrating a functional configuration of a first node.

FIG. 5 is a schematic diagram illustrating an exemplary format of an inspection packet that is unicast. In the inspection packet that the communication control unit 48A of one GW node 10B unicasts to one first node 10A, in the data field of the inspection packet as explained earlier with reference to FIG. 3, the TTL correction value is additionally set.

In this way, the communication control unit 48A of the GW node 10B broadcasts, at regular intervals, an inspection packet that includes information indicating broadcasting as the destination information and includes the TTL initial value in the data field. Moreover, to the first node 10A being a transmission source of the packet having the TTL equal to or larger than the second threshold value, the communication control unit 48A unicasts an inspection packet in which the TTL correction value is additionally set in the data field.

Given below is the explanation of an exemplary functional configuration of the first node 10A according to the first embodiment.

FIG. 6 is a schematic diagram illustrating an exemplary functional configuration of the first node 10A.

The first node 10A includes a memory unit 30, a communication unit 32, and a control unit 38. The memory unit 30, the communication unit 32, and the control unit 38 are communicably connected to each other by a bus 36.

The memory unit 30 is used to store a variety of data. In the first embodiment, the memory unit 30 is used to store management information 30A. The management information 30A is updated by the control unit 38 (explained later). Regarding the data configuration of the management information 30A, the detailed explanation is given later.

The communication unit 32 is a function unit for transmitting packets to and receiving packets from other nodes 10 present in the wireless multihop mesh network 2.

The control unit 38 includes a registration managing unit 38A and a communication managing unit 38B. The registration managing unit 38A and the communication managing unit 38B are implemented using, for example, one or more processors. For example, those constituent elements can be implemented by causing a processor such as a CPU to execute computer programs, that is, can be implemented using a software. Alternatively, the constituent elements can be implemented using a dedicated IC, that is, can be implemented using hardware. Still alternatively, the constituent elements can be implemented using a combination of software and hardware. In the case of using a plurality of processors, each processor can implement one of the constituent elements or implement two or more of the constituent elements.

Based on an inspection packet received from one GW node 10B, the registration managing unit 38A registers, in the management information 30A, the setting-purpose TTL corresponding to the difference between the TTL initial value specified in the inspection packet and the TTL so as to have correspondence with the GWID which represents the second identification information of that GW node 10B.

More specifically, if the destination information specified in an inspection packet indicates broadcasting, then the registration managing unit 38A performs the following operations. As explained earlier, at regular intervals, the GW node 10B broadcasts an inspection packet that includes the source information, the destination information, the TTL, and the TTL initial value specified in the data field (see FIG. 3). In that case, the registration managing unit 38A registers the setting-purpose TTL, which corresponds to the difference between the TTL initial value and the TTL specified in the inspection packet, in the management information 30A.

FIG. 7 is a schematic diagram illustrating an exemplary data configuration of the management information 30A. The management information 30A is information in which the GWID representing the second identification information of the GW node 10B; the setting-purpose TTL; and the TTL initial value are held so as to have correspondence with each other. Specifically, in the management information 30A, a single GWID is registered so as to have correspondence with a single setting-purpose TTL and a single TTL initial value.

In the first embodiment, the registration managing unit 38A calculates, as the setting-purpose TTL, the difference between the TTL initial value specified in the inspection packet and the TTL specified in the inspection packet. More specifically, the registration managing unit 38A calculates, as the setting-purpose TTL, the value obtained by subtracting the TTL specified in the inspection packet from the TTL initial value specified in the inspection packet.

Then, the registration managing unit 38A registers the calculated setting-purpose TTL in the management information 30A so as to have correspondence with the GWID and the TTL initial value that are specified in the inspection packet used in calculating the setting-purpose TTL.

Every time an inspection packet is received from one of a plurality of GW nodes 10B included in the wireless multihop mesh network 2, the registration managing unit 38A calculates the setting-purpose TTL and registers it in the management information 30A. Thus, in the registration managing unit 38A, the setting-purpose TTL and the TTL initial value get registered for each of a plurality of GW nodes 10B included in the wireless multihop mesh network 2.

Meanwhile, each first node 10A receives, from a single GW node 10B, a plurality of inspection packets via a plurality of mutually different routes involving one or more first nodes 10A. That is, the inspection packets broadcast from a single GW node 10B reach the concerned first node 10A via various routes in the wireless multihop mesh network 2.

In that regard, it is desirable that the registration managing unit 38A calculates, as the setting-purpose TTL, the difference between the maximum TTL value, from among the TTL values specified in a plurality of inspection packets received from a single GW node 10B, and the TTL initial value specified in the inspection packets.

More specifically, the registration managing unit 38A calculates the setting-purpose TTL using Equation (1) given below.

$$TTLm = Ti - \max Tm \quad (1)$$

In Equation (1), TTLm represents the setting-purpose TTL of the GW node 10 having "m" as the GWID. Moreover, Ti represents the TTL initial value included in the inspection packets received from the GW node 10B having the GWID "m". Moreover, Tm represents the set of TTL values specified in the inspection packets received from the GW node 10B having the GWID "m". Moreover, maxTm represents the maximum TTL value from the set of TTL values specified in the inspection packets received from the GW node 10B having the GWID "m".

As a result of calculating the difference between the maximum TTL value, from among the TTL values specified in a plurality of inspection packets received from the same GW node 10B, and the TTL initial value, which is specified in the inspection packets, as the setting-purpose TTL; the registration managing unit 38A becomes able to calculate the setting-purpose TTL using the maximum TTL value, that is, using the TTL value specified in the inspection packet that is received from the concerned GW node 10B via the shortest route.

Meanwhile, when the destination information specified in an inspection packet indicates unicasting and indicates the concerned first node 10A, the registration managing unit 38A performs the following operations. In that case, the registration managing unit 38A registers, as the new setting-purpose TTL in the management information 30A, the value obtained by subtracting the TTL correction value specified in the concerned inspection packet from the setting-purpose TTL corresponding to the GWID specified in the concerned inspection packet.

As explained above, if the TTL specified in a packet received from any first node 10A is equal to or larger than the second threshold value, then the GW node 10B unicasts an inspection packet, which includes the abovementioned TTL as the TTL correction value, to the concerned first node 10A (see FIG. 5).

When the destination information specified in an inspection packet received from one GW node 10B indicates unicasting and indicates the concerned first node 10A, the registration managing unit 38A identifies the TTL correction value specified in the data field of the inspection packet. Moreover, the registration managing unit 38A identifies the GWID of the GW node 10B being a transmission source of the inspection packet. Herein, the registration managing unit 38A reads the source information specified in the inspection packet, and identifies the GWID of the GW node 10B being a transmission source of the inspection packet.

Then, the registration managing unit 38A reads the setting-purpose TTL corresponding to the identified GWID from the management information 30A. Then, the registration managing unit 38A registers, as the new setting-purpose TTL corresponding to the concerned GWID in the management information 30A, the value obtained by subtracting the identified TTL correction value from the read setting-purpose TTL.

Thus, when the TTL correction value is included in an inspection packet, the registration managing unit 38A becomes able to update the setting-purpose TTL corresponding to the GWID of the GW node 10B being a transmission source of the inspection packet.

Meanwhile, when the destination information specified in an inspection packet indicates unicasting and indicates some other first node 10A, the registration managing unit 38A performs the following operations. In that case, the registration managing unit 38A determines whether or not the difference between the TTL initial value specified in the previously-received inspection packet, which was received from one GW node 10B, and the TTL specified in the currently-received inspection packet, which is received from the same GW node 10B, is equal to or larger than a first threshold value. If the difference is equal to or larger than the first threshold value, then the registration managing unit 38A registers the difference as the setting-purpose TTL in the management information 30A so as to have correspondence with the GWID.

More specifically, when the destination information specified in an inspection packet received from any GW node 10B indicates unicasting and indicates some other first node 10A, the registration managing unit 38A identifies the TTL specified in the inspection packet. Moreover, the registration managing unit 38A identifies the GWID of the GW node 10B being a transmission source of the inspection packet. Herein, the registration managing unit 38A reads the source information specified in the inspection packet and identifies the GWID of the GW node 10B being a transmission source of the inspection packet.

Then, the registration managing unit 38A reads the TTL initial value corresponding to the identified GWID from the management information 30A. With this processing, the registration managing unit 38A reads the TTL initial value that was specified in the previously-received inspection packet received from the GW node 10B identified by the concerned GWID.

Subsequently, the registration managing unit 38A determines whether or not the difference, which represents the subtracted value obtained by subtracting the TTL specified in the currently-received inspection packet from the previously-received TTL initial value, is equal to or larger than the first threshold value.

The first threshold value can be set as a threshold value to be used in determining whether or not the value of the setting-purpose TTL for the concerned GW node 10B needs to be varied in the first node 10A. For example, the registration managing unit 38A can set the first threshold value in advance according to: the network topology of the wireless multihop mesh network 2; the communication success rate of the wireless multihop mesh network 2; and the ease in the connectivity of the wireless multihop mesh network 2. More specifically, the registration managing unit 38A can set in advance a high first threshold value in proportion to the ease in the connectivity or in proportion to a high communication success rate. That is, the registration managing unit 38A sets a low first threshold value in proportion to the difficulty in connectivity or in proportion to a low communication success rate. With that, the value of the setting-purpose TTL can be made more easily variable.

If the difference, which represents the subtracted value obtained by subtracting the TTL specified in the currently-received inspection packet from the previously-received TTL initial value, is equal to or larger than the first threshold value, then the registration managing unit 38A registers the difference as the setting-purpose TTL corresponding to the concerned GWID in the management information 30A. On the other hand, if the difference is smaller than the first threshold value, then the registration managing unit 38A does not update the setting-purpose TTL in the management information 30A.

Thus, when the TTL correction value is included in an inspection packet, the registration managing unit 38A becomes able to update the setting-purpose TTL corresponding to the GWID of the GW node 10B being a transmission source of the inspection packet.

Given below is the explanation of the communication managing unit 38B.

The communication managing unit 38B sets, as the TTL of the packet addressed to a particular GW node 10B, the setting-purpose TTL corresponding to the GWID of that particular GW node 10B in the management information 30A; and then transmits the packet. More specifically, in the case of transmitting a packet originating in the concerned first node 10A, the communication managing unit 38B transmits the packet in which the setting-purpose TTL corresponding to the GWID of the concerned GW node 10B in the management information 30A is set as the TTL.

More specifically, the communication managing unit 38B sets, as the TTL of the packet, the setting-purpose TTL that, in the management information 30A, corresponds to the GWID of the GW node 10B to which the packet is to be transmitted. Moreover, the communication managing unit 38B sets the GWID of the concerned GW node 10B as the destination information of the packet, and sets the identification information of the corresponding first node 10A as the source information. Then, the communication managing unit 38B transmits the packet having such setting done therein.

In the management information 30A, the optimum setting-purpose TTL is registered for each GW node 10B by the registration managing unit 38A. Hence, when the setting-purpose TTL that, in the management information 30A, corresponds to the GWID of any GW node 10B to which the packet is to be transmitted is set as the TTL of the packet addressed to the concerned GW node 10B, the communication managing unit 38B becomes able to perform flooding communication of the packet, in which the TTL is set to enable holding down unnecessary transfer, to that GW node 10B.

Moreover, in the case of transferring a packet, which is received from some other first node 10A, to any GW node 10B; if the TTL included in that packet is smaller than the setting-purpose TTL corresponding to the GWID representing the destination specified in that packet or is equal to "0", the communication managing unit 38B excludes the received packet from the target packets for transfer and destroys the excluded packet.

That is, from among the packets that are transmitted by way of flooding communication from some other first node 10A to any GW node 10B, the communication managing unit 38B does not treat, as the target packets for transfer, the packets that, upon reaching the concerned first node 10A, have the TTL equal to "0"; and destroys such packets. Thus, in the wireless communication system 1 according to the first embodiment, regarding the packets that make a detour to the GW node 10B, the TTL becomes equal to "0" before the packets reach the GW node 10B. Thus, it becomes possible for the communication managing unit 38B to hold down unnecessary transfer.

Since the communication managing unit 38B does not transfer but destroys the packets in which the TTL satisfies the abovementioned condition, it becomes possible to hold down excessive replication of packets attributed to the transfer and thus to hold down congestion.

Moreover, from among the packets that are transmitted by way of flooding communication from some other first node 10A to any GW node 10B; the communication managing unit 38B does not treat, as the target packets for transfer, the packets that, upon reaching the concerned first node 10A, have the TTL smaller than the setting-purpose TTL corresponding to the GWID of the concerned GW node 10B; and destroys such packets.

For that reason, from among the target packets for transfer to the GW node 10B via the concerned first node 10A, the communication managing unit 38B becomes able to destroy, without transferring, the packets having the TTL, which represents the transferable count, smaller than the setting-purpose TTL, and hence becomes able to hold down any unnecessary transfer. That is, the communication managing unit 38B becomes able to destroy, without transferring, such packets which are determined to be unreachable to the GW node 10B. Moreover, the communication managing unit 38B becomes able to hold down the transfer of the packets that are forwarded in a different direction than the direction of the destination GW node 10B. That enables the communication managing unit 38B to hold down any unnecessary transfer.

Moreover, since the communication managing unit 38B destroys, without transferring, the packets in which the TTL satisfies the abovementioned condition; it becomes possible to hold down excessive replication of packets attributed to the transfer and thus to hold down congestion.

Given below is an exemplary flow of the information processing performed by the first node 10A according to the first embodiment.

Figure 8:
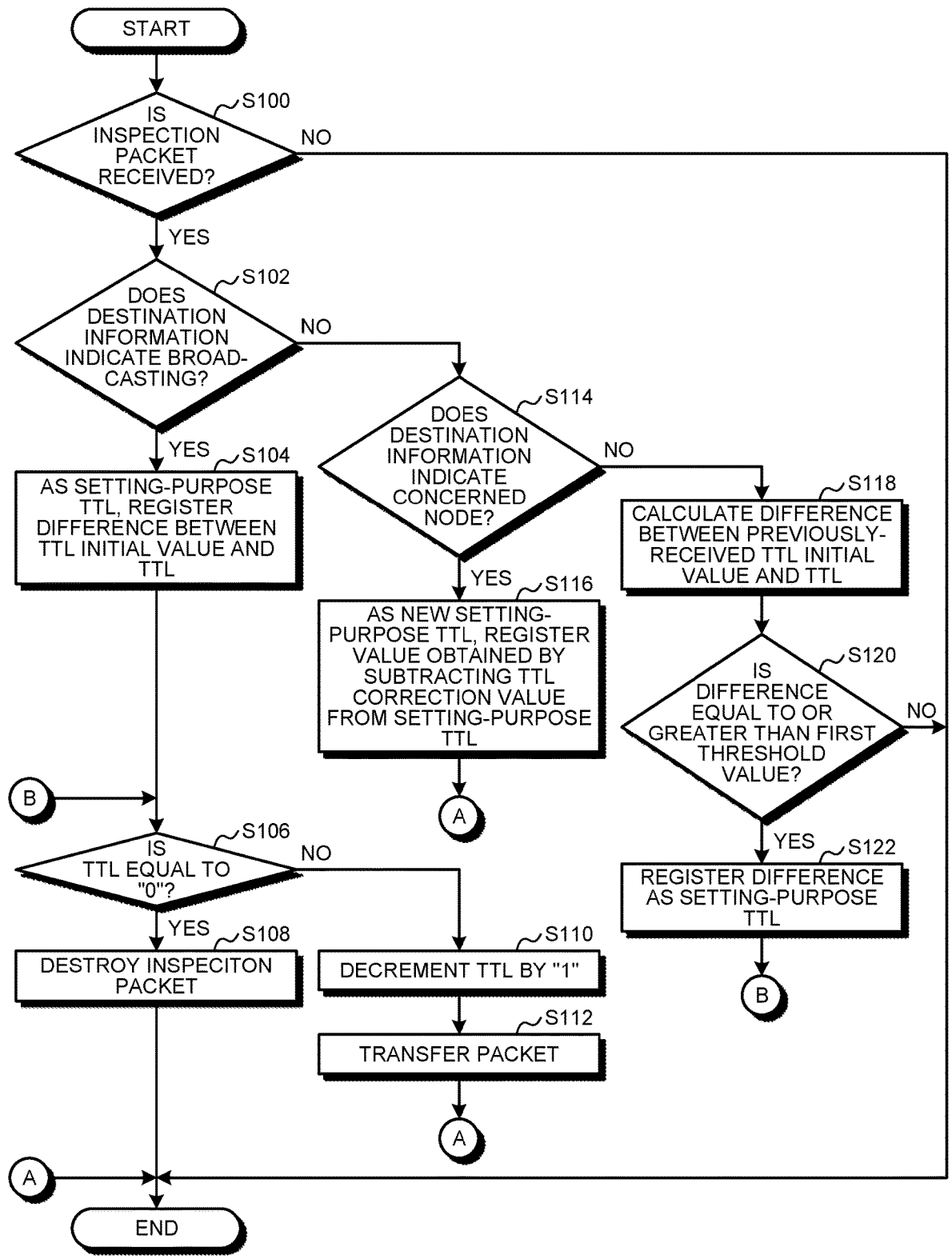
FIG. 8 is a flowchart for explaining a flow of the information processing performed by the first node.

FIG. 8 is a flowchart for explaining an exemplary flow of the information processing performed by the first node 10A at the time of receiving an inspection packet.

The registration managing unit 38A of the first node 10A determines whether or not an inspection packet is received (Step S100). For example, the registration managing unit 38A determines whether or not the inspection packet is received by determining whether or not the source information of the received inspection packet indicates a GWID.

In response to determining that an inspection packet is not received (No at Step S100), then the present routine is ended. On the other hand, in response to determining that an inspection packet is received (Yes at Step S100), the system control proceeds to Step S102.

At Step S102, the registration managing unit 38A determines whether or not the destination information specified in the inspection packet received at Step S100 indicates broadcasting (Step S102). In response to determining that broadcasting is indicated (Yes at Step S102), then the system control proceeds to Step S104.

At Step S104, the registration managing unit 38A sets the difference between the TTL initial value and the TTL, which are specified in the inspection packet received at Step S100, as the setting-purpose TTL; and registers the difference in the management information 30A so as to have correspondence with the GWID which represents the source information specified in the received inspection packet (Step S104).

Subsequently, the registration managing unit 38A determines whether or not the TTL specified in the inspection packet received at Step S100 is equal to "0" (Step S106). In response to determining that the TTL is equal to "0" (Yes at Step S106), then the registration managing unit 38A destroys the inspection packet received at Step S100 (Step S108). That marks the end of the present routine.

However, in response to determining that the TTL is larger than "0" (No at Step S106), then the system control proceeds to Step S110. At Step S110, the communication managing unit 38B decrements, by "1", the TTL specified in the inspection packet received at Step S100 (Step S110). Then, the communication managing unit 38B transfers the inspection packet, which has the TTL decremented by "1" at Step S110, to some other first node 10A (Step S112). That marks the end of the present routine.

Meanwhile, if it is determined at Step S102 that the destination information indicates unicasting (No at Step S102), then the system control proceeds to Step S114. At Step S114, the registration managing unit 38A determines whether or not the destination information specified in the inspection packet received at Step S100 indicates the corresponding first node 10A (Step S114). Herein, the registration managing unit 38A performs the determination at Step S114 by determining whether or not the destination information specified in the inspection packet received at Step S100 indicates unicasting and indicates identification information of the corresponding first node 10A.

If it is determined at Step S114 that the destination information indicates the corresponding first node 10A (Yes at Step S114), then the system control proceeds to Step S116. At Step S116, the registration managing unit 38A registers, in the management information 30A to have correspondence with the GWID specified in the inspection packet received at Step S100, the value as the new setting-purpose TTL, which has been obtained by subtracting the TTL correction value specified in that inspection packet from the setting-purpose TTL corresponding to the concerned GWID (Step S116). That marks the end of the present routine.

If it is determined at Step S114 that the destination information indicates some other first node 10A (No at Step S114), then the system control proceeds to Step S118. At Step S118, the registration managing unit 38A reads, from the management information 30A, the TTL initial value specified in the inspection packet that was received at the previous time from the GW node 10B being a transmission source of the inspection packet received at Step S100. Then, the registration managing unit 38A calculates the difference by subtracting the TTL specified in the inspection packet received at Step S100 from the read TTL initial value (Step S118).

Subsequently, the registration managing unit 38A determines whether or not the difference calculated at Step S118 is equal to or larger than the first threshold value (Step S120). In response to determining that the difference is equal to or larger than the first threshold value (Yes at Step S120), then the system control proceeds to Step S122. Then, the registration managing unit 38A registers, in the management information 30A, the difference, which is calculated at Step S118, as the setting-purpose TTL corresponding to the GW node 10B being a transmission source of the inspection packet received at Step S100 (Step S122). Then, the system control proceeds to Step S106. On the other hand, in response to determining that the difference is smaller than the first threshold value (No at Step S120), then the present routine is ended.

Given below is the explanation of an exemplary flow of the information processing performed by the first node 10A at the time of transmitting or transferring a packet.

Figure 9:
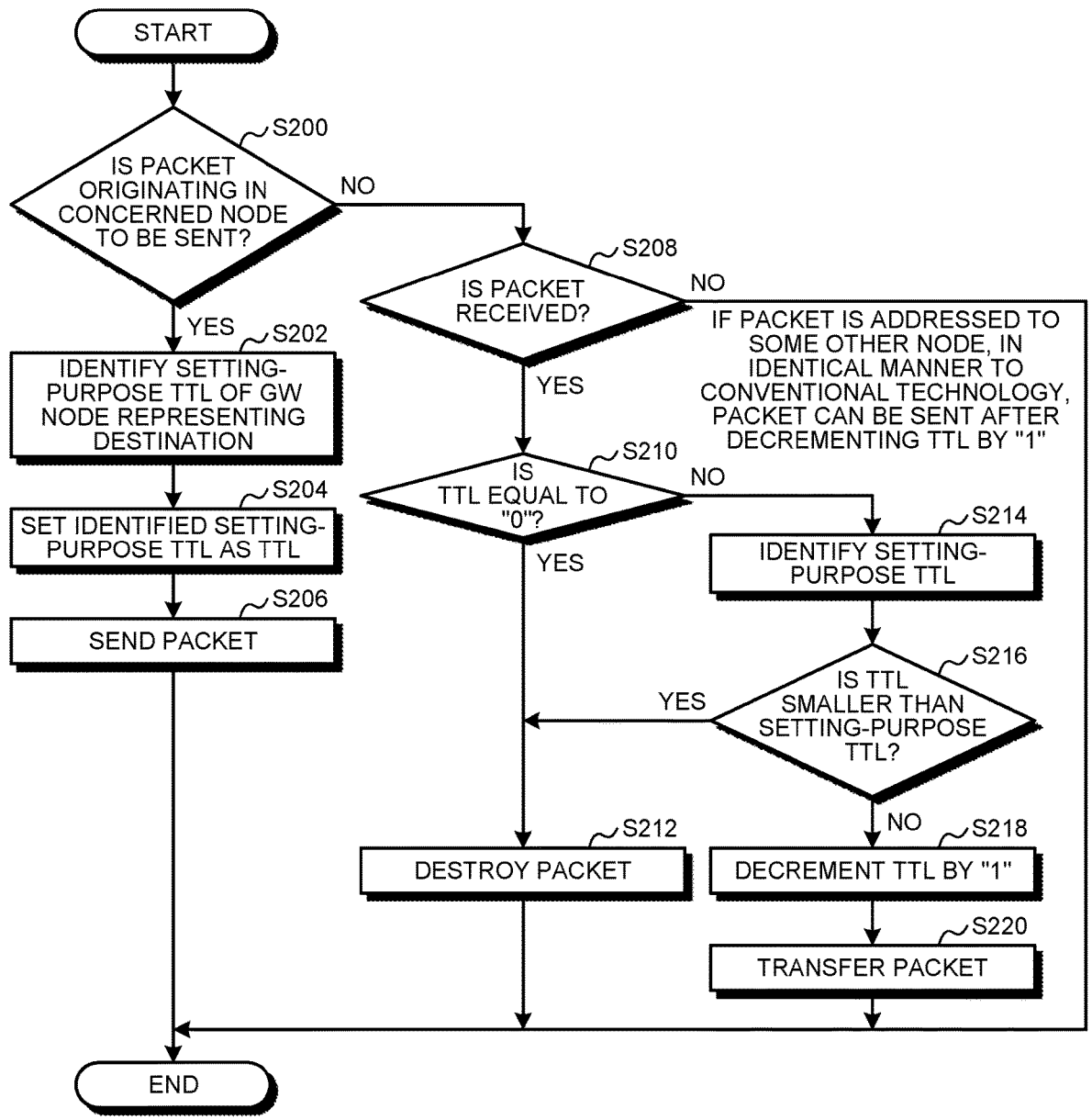
FIG. 9 is a flowchart for explaining a flow of the information processing performed by the first node.

FIG. 9 is a flowchart for explaining an exemplary flow of the information processing performed by the first node 10A at the time of transmitting or transferring a packet.

The communication managing unit 38B determines whether or not to send a packet originating in the corresponding first node 10A (Step S200). For example, the communication managing unit 38B performs the determination at Step S200 by determining whether or not a predetermined transmission condition set about transmitting the detection result of a sensor connected to the first node 10A is satisfied.

If it is determined to send a packet originating in the concerned first node 10A (Yes at Step S200), then the system control proceeds to Step S202. At Step S202, the communication managing unit 38B identifies the setting-purpose TTL corresponding to the GWID of the target GW node 10B for transmission as set in the management information 30A (Step S202). Then, the communication managing unit 38B sets the setting-purpose TTL, which is identified at Step S202, as the TTL of the packet (Step S204). Subsequently, the communication managing unit 38B also sets the GWID of the concerned GW node 10B as the destination information for the packet, and transmits the packet in which the identification information of the corresponding first node 10A is set as the source information (Step S206). That marks the end of the present routine.

On the other hand, if it is determined not to send a packet (No at Step S200), then the system control proceeds to Step S208. At Step S208, the communication managing unit 38B determines whether or not a packet is received from some other first node 10A (Step S208). In response to determining that a packet is not received from some other first node 10A (No at Step S208), then the present routine is ended.

On the other hand, in response to determining that a packet is received from some other first node 10A (Yes at Step S208), then the system control proceeds to Step S210. As explained above, in the first embodiment, the explanation is given about an example that the first nodes 10A that constitute the wireless multihop mesh network 2 send packets to the GW nodes 10B representing the destinations. Hence, when it is determined at Step S208 that a packet is received from some other first node 10A, it implies that the communication managing unit 38B receives a packet that has originated from some other first node 10A and that is addressed to some GW node 10B.

At Step S210, the communication managing unit 38B determines whether or not the TTL specified in the packet received at Step S208 is equal to "0" (Step S210). In response to determining that the TTL is equal to "0" (Yes at Step S210), then the system control proceeds to Step S212. Subsequently, the communication managing unit 38B destroys the packet received at Step S208 (Step S212). That marks the end of the present routine.

On the other hand, in response to determining that the TTL is larger than "0" (No at Step S210), then the system control proceeds to Step S214. At Step S214, the communication managing unit 38B identifies, from the management information 30A, the setting-purpose TTL corresponding to the GWID that represents the destination specified in the packet received at Step S208 (Step S214). Then, the communication managing unit 38B determines whether or not the TTL specified in the packet, which is received at Step S208, is smaller than the setting-purpose TTL identified at Step S214 (Step S216). If the communication managing unit 38B determines that the TTL is smaller than the setting-purpose TTL (Yes at Step S216), then the system control proceeds to Step S212.

On the other hand, if the communication managing unit 38B determines that the TTL is equal to or larger than the setting-purpose TTL (No at Step S216), then the system control proceeds to Step S218. Subsequently, the communication managing unit 38B decrements, by "1", the TTL specified in the packet received at Step S208 (Step S218). Subsequently, the communication managing unit 38B transfers the packet having the TTL decremented by "1" at Step S218 (Step S220). That marks the end of the present routine.

Given below is the explanation of an exemplary flow of the information processing performed by the GW node 10B.

Figure 10:
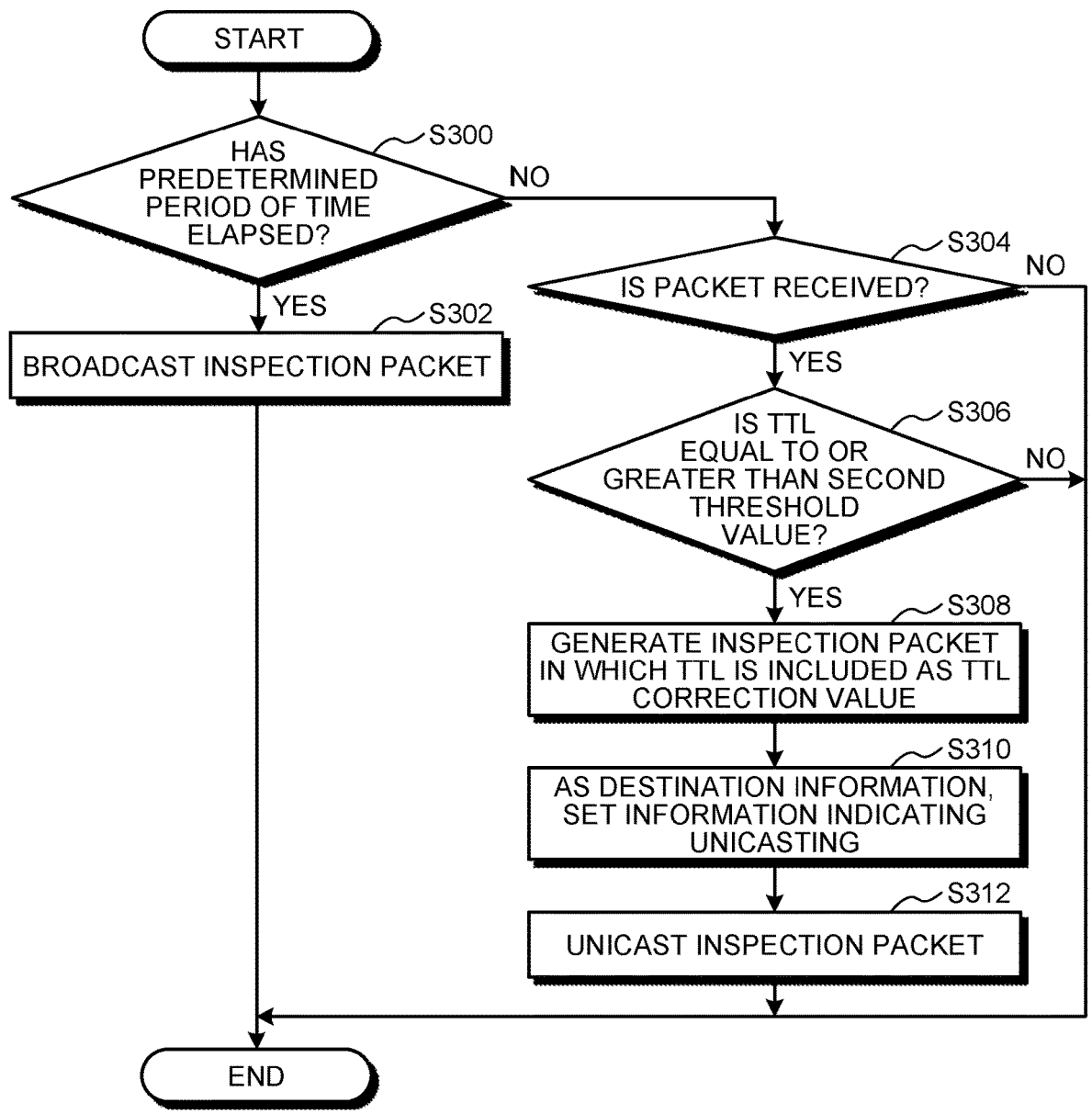
FIG. 10 is a flowchart for explaining a flowchart of the information processing performed by the GW node.

FIG. 10 is a flowchart for explaining an exemplary flowchart of the information processing performed by the GW node 10B.

The communication control unit 48A of the GW node 10B determines whether or not a predetermined period of time has elapsed (Step S300). The communication control unit 48A performs the determination at Step S300 by determining whether or not the period of time that elapsed since the timing of previous transmission of the inspection packet, in which the information indicating broadcasting was specified as the destination information, is equal to or larger than a predetermined period of time.

If the communication control unit 48A determines that a predetermined period of time has elapsed (Yes at Step S300), then the system control proceeds to Step S302. At Step S302, the communication control unit 48A sets the GWID of the corresponding GW node 10B as the source information, sets the information indicating broadcasting as the destination information, and broadcasts an inspection packet in which the TTL and the TTL initial value are set (Step S302). That marks the end of the present routine.

On the other hand, if the communication control unit 48A determines that the predetermined period of time has not elapsed (No at Step S300), then the system control proceeds to Step S304. Subsequently, the communication control unit 48A determines whether or not a packet is received from any first node 10A (Step S304). In response to determining that a packet is not received from any first node 10A (No at Step S304), then it marks the end of the present routine. On the other hand, in response to determining that a packet is received from any first node 10A (Yes at Step S304), then the system control proceeds to Step S306.

At Step S306, the communication control unit 48A determines whether or not the TTL specified in the packet received at Step S304 is equal to or larger than the second threshold value (Step S306). In response to determining that the TLL is not equal to or larger than the second threshold value (No at Step S306), then the present routine is ended. On the other hand, in response to determining that the TLL is equal to or larger than the second threshold value (Yes at Step S306), then the system control proceeds to Step S308.

At Step S308, the communication control unit 48A treats the TTL specified in the packet received at Step S304 as the TTL correction value, and generates an inspection packet in which that TTL correction value is specified in the data field (Step S308). Subsequently, as the destination information of the inspection packet generated at Step S308, the communication control unit 48A sets the identification information of the first node 10A as specified in the source information of the packet received at Step S304, and sets information indicating unicasting (Step S310).

Then, the communication control unit 48A unicasts the inspection packet, which was generated at Step S308 and for which the setting was done at Step S310, to the first node 10A that had transmitted the packet received at Step S304 (Step S312). That marks the end of the present routine.

As explained above, the wireless communication system 1 according to the first embodiment includes the first nodes 10A (first wireless communication devices) that constitute the wireless multihop mesh network 2 and that perform flooding communication, and includes the GW nodes 10B (second wireless communication devices) that constitute the wireless multihop mesh network 2 and that are capable of communicating with the external network NW.

Each first node 10A includes the registration managing unit 38A and the communication managing unit 38B. Based on an inspection packet which is received from a particular GW node 10B and in which the GWID (second identification information) of that GW node 10B is specified along with the TTL initial value and the TTL; the registration managing unit 38A registers the setting-purpose TTL in the management information 30A so as to have correspondence with the GWID. The setting-purpose TTL to be registered corresponds to the difference between the TTL initial value and the TTL specified in the inspection packet. The communication managing unit 38B sets the setting-purpose TTL, which is associated to the GWID in the management information 30A, as the TTL of the packet addressed to the GW node identified by the GWID, and then transmits that packet.

In the case of performing flooding communication in the wireless multihop mesh network 2, it is difficult to hold down unnecessary transfer if the related art is implemented.

In the flooding communication technology, as explained earlier, at the time of performing multihop communication, each of a plurality of nodes 10 performs transmission by selecting all other nodes 10 present within its communication range as the transmission destinations or the transfer destinations. Hence, in the flooding communication technology, multihop communication can be performed with a higher degree of reliability. Moreover, in the flooding communication technology, packet communication is performed by practically using all multihop communication routes in a simultaneous manner. Since particular multihop communication routes are not selected in the flooding communication, the network management becomes simpler as compared to other mesh network technologies; and there is also the advantage that, even if communication among a few nodes 10 gets interrupted, the communication can still be carried on without significant hindrance.

Moreover, in the flooding communication technology, when any node 10 included in the wireless multihop mesh network 2 receives a packet addressed to some other node 10, the concerned node 10 broadcasts that packet to all surrounding nodes thereby making it possible to achieve robust communication.

However, in the flooding communication technology, each of a plurality of nodes 10 constituting the wireless multihop mesh network 2 treats all other nodes 10 within its communication range as the transfer destinations. Hence, in the flooding communication technology, in some cases, packets get transmitted to such nodes 10 that clearly make a significant detour to the destination, and that is further followed by the transfer of the packets by those nodes. As a result, there is a risk that the packets get excessively replicated thereby causing congestion in the network.

For example, consider the case of the wireless multihop mesh network 2 illustrated in FIG. 1. Moreover, assume that the first node 10A1 transmits a packet to the GW node 10B1 representing the destination. When the first node 10A1 performs flooding communication of the packet, the other first nodes 10A that receive the packet perform flooding communication to further transfer the received packet to the respective other surrounding first nodes 10A. In this case, the route in which the packet reaches the GW node 10B1 in two hops from the first node 10A1 via the first node 10A3 is the shortest route. However, in the flooding communication technology, since the packet gets transferred to all surrounding nodes 10, a route making an excessive detour by involving the first node 10A2 and involving the first node 10A4 to the first node 10A9 is also used for transferring the packet.

Although there may be situations in which somewhat long routes should be maintained from the perspective of redundancy, the routes making an excessive detour result in an increase in the replication count of the packets and a heightened risk of congestion; and the transmission delay also increases. There are times when the risk of congestion and the transmission delay adversely impacts the applications.

In JP 7045451 B (hereinafter, "Patent Literature 1"), a method is proposed in which the number of times for which each relay node transfers packets is decided based on the success rate of end-to-end communication. In a mesh network, the flooding transfer is performed via various routes. For that reason, there are times when the relay nodes transfer the same data for multiple times. In Patent Literature 1, the disclosure is about defining the number of times for performing such transfer. More specifically, in Patent Literature 1, at the time of transferring pairs of transmission-reception packets via a plurality of relay nodes, the ratio of the data packets transferred by the concerned node with respect to the confirmation-response packets is calculated. Then, according to Patent Literature 1, if that ratio is high, the reliability of the communication route is considered to be high, and the data transfer count is held down. On the other hand, according to Patent Literature 1, if the ratio is low, then the possibility of losing the packets is considered to be high, and the data transfer count is increased. The method disclosed in Patent Literature 1 is intended to secure the redundancy corresponding to the packet loss ratio. Hence, that method is less effective against the problem of packet transmission via unnecessary routes.

In WO 2018/207411 (hereinafter, "Patent Literature 2"), a method is proposed in which multihop transfer is held down by setting an appropriate value of the TTL. In Patent Literature 2, each node periodically transmits, to the surrounding nodes, a monitoring packet in which the TTL initial value is stored. Then, each node that receives the monitoring packet treats the difference between the TTL initial value and the reception-time TTL as the TTL to be set in the packets to be transmitted to the node being a transmission source of the monitoring packet. However, in Patent Literature 2, since each node constituting the network periodically transmits a monitoring packet, as the number of nodes in the network goes on increasing, the network gets flooded with monitoring packets thereby likely causing congestion.

In this way, in the case of using the flooding communication technology in the wireless multihop mesh network 2, there are times when unnecessary packet transmission occurs if the related art is implemented.

In contrast, in the wireless communication system 1 according to the first embodiment, the registration managing unit 38A of each first node 10A, which performs flooding communication, registers the setting-purpose TTL and the TTL in the management information 30A so as to have correspondence with the GWID of the GW node 10B. The setting-purpose TTL to be registered corresponds to the difference between the TTL initial value and the TTL specified in the inspection packet received from the GW node 10B. For that reason, for each GW node 10B identified by a GWID, the setting-purpose TTL gets registered that represents the TTL in the case where the concerned GW node 10B is reached from one first node 10A, in which the management information 30A is stored, via the shortest route or via a route close to the shortest route.

The communication managing unit 38B sets the setting-purpose TTL, which corresponds to a GWID specified in the management information 30A, as the TTL of the packets addressed to the GW node 10B identified by the concerned GWID, and then transmits those packets.

In this way, in the wireless communication system 1 according to the first embodiment, the setting-purpose TTL, which corresponds to the difference between the TTL initial value and the TTL specified in an inspection packet received from one GW node 10B, is set as the TTL of the packets addressed to the GW node 10B being a transmission source of the inspection packet.

For that reason, the TTL specified in the packets that are transmitted by way of flooding communication from a particular first node 10A to a particular GW node 10B representing the destination is adjusted to an appropriate value for that particular GW node 10B. In other words, the TTL specified in the packets that are transmitted by way of flooding communication from a particular first node 10A to a particular GW node 10B representing the destination represents the TTL in the case where the concerned GW node 10B is reached via the shortest route or via a route close to the shortest route. Hence, the TTL specified in the packets transmitted from each first node 10A is prevented from becoming an excessively large value, thereby enabling holding down unnecessary transfer of packets.

Thus, the wireless communication system 1 according to the first embodiment enables holding down unnecessary transfer.

Moreover, in the wireless communication system 1 according to the first embodiment, the GW nodes 10B send inspection packets. Hence, as compared to the case in which all nodes 10 send inspection packets, the wireless communication system 1 according to the first embodiment becomes able to reduce the congestion and the interference risk in the wireless multihop mesh network 2.

Moreover, since unnecessary packet transfer can be held down, the wireless communication system 1 according to the first embodiment becomes able to hold down the power consumption required for the transmission and the transfer.

Second Embodiment

In the first embodiment described above, the explanation is given about an example that the GW nodes 10B included in the wireless multihop mesh network 2 do not change positions and have fixed positions within the wireless multihop mesh network 2.

In a second embodiment, the explanation is given about an example that the GW nodes 10B included in the wireless multihop mesh network 2 are configured to be able to change positions within the wireless multihop mesh network 2.

Figure 11:
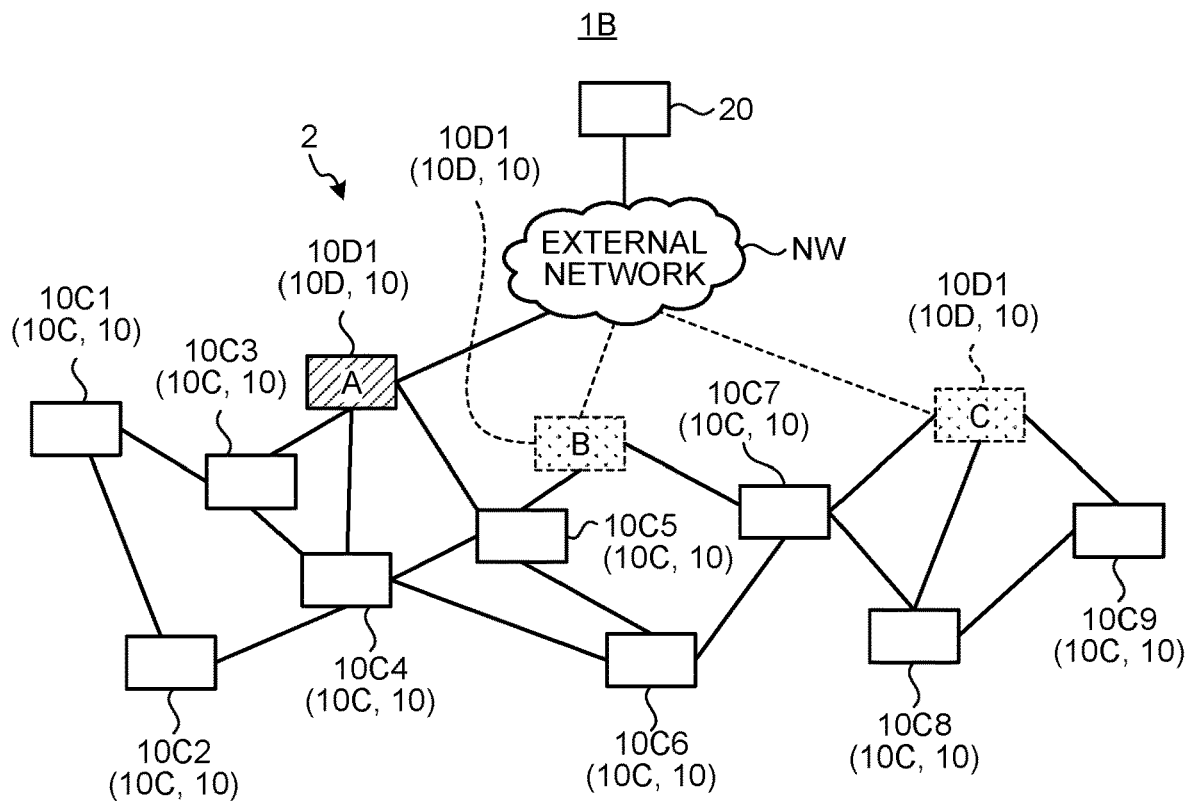
FIG. 11 is a schematic diagram illustrating a wireless communication system.

FIG. 11 is a schematic diagram illustrating an example of a wireless communication system 1B according to the second embodiment.

The wireless communication system 1B includes a plurality of nodes 10 performing wireless communication; the external network NW; and the server device 20 that is connected to the network NW. The nodes 10 and the server device 20 are identical to the first embodiment. That is, the nodes 10 constitute the wireless multihop mesh network 2 and perform flooding communication. In the second embodiment, in an identical manner to the first embodiment, the explanation is given for an example that Bluetooth Mesh explained in Nonpatent Literature 1 mentioned above is used as the standard specification for the wireless multihop mesh network 2.

In the second embodiment, as the nodes 10, the first nodes 10A are substituted with first nodes 10C, and the GW nodes 10B are substituted with a GW node 10D.

In an identical manner to the first nodes 10A, the first nodes 10C constitute the wireless multihop mesh network 2 and perform flooding communication. In the second embodiment, the first nodes 10C send packets to the GW node 10D, which represents the destination, in place of the GW nodes 10B.

In an identical manner to the GW nodes 10B, the GW node 10D constitutes the wireless multihop mesh network 2 and performs flooding communication. Moreover, the GW node 10D is capable of establishing connection with the external network NW.

In the second embodiment, the GW node 10D is installed to be able to change positions within the wireless multihop mesh network 2. For example, as illustrated in FIG. 11, the GW node 10D is installed to be able to change positions among positions A, B, and C.

Any position in the wireless multihop mesh network 2 is expressed, for example, as the information indicating which first node 10C is connectible in a single hop from among a plurality of first nodes 10C included in the wireless multihop mesh network 2.

Figure 12:
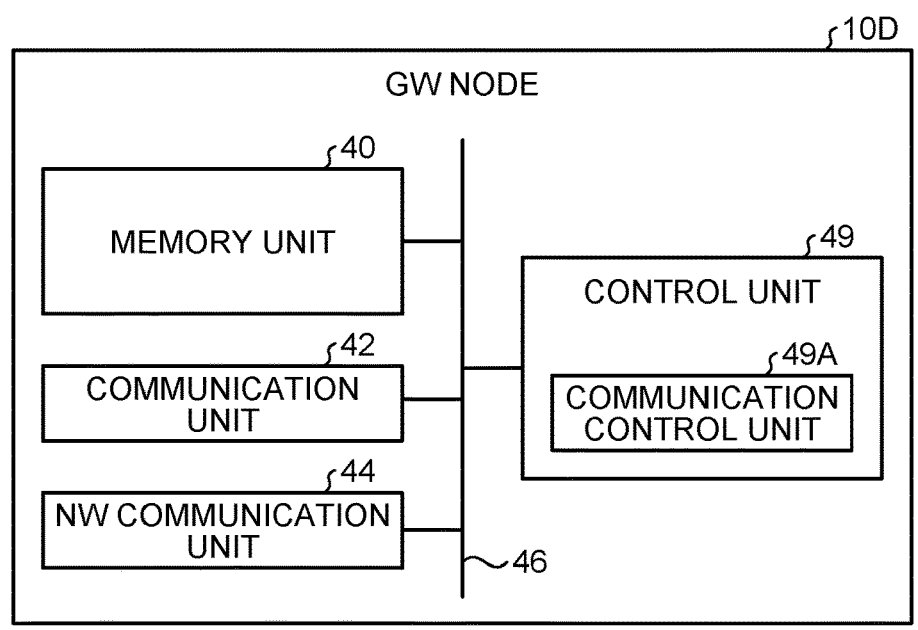
FIG. 12 is a schematic diagram illustrating a functional configuration of a GW node.

FIG. 12 is a schematic diagram illustrating an exemplary functional configuration of the GW node 10D.

The GW node 10D includes the memory unit 40, the communication unit 42, the NW communication unit 44, and a control unit 49. Thus, except for the fact that the control unit 49 is included in place of the control unit 48, the GW node 10D is identical to the GW node 10B according to the first embodiment.

The control unit 49 includes a communication control unit 49A. Thus, except for the fact that the communication control unit 49A is included in place of the communication control unit 48A, the control unit 49 is identical to the control unit 48 according to the first embodiment.

In an identical manner to the communication control unit 48A according to the first embodiment, the communication control unit 49A performs control to send inspection packets to the first nodes 10A included in the wireless multihop mesh network 2. Herein, the communication control unit 49A transmits an inspection packet that further includes transmission location information of the GW node 10D at the time of transmitting the inspection packet.

Figures 13, 14:
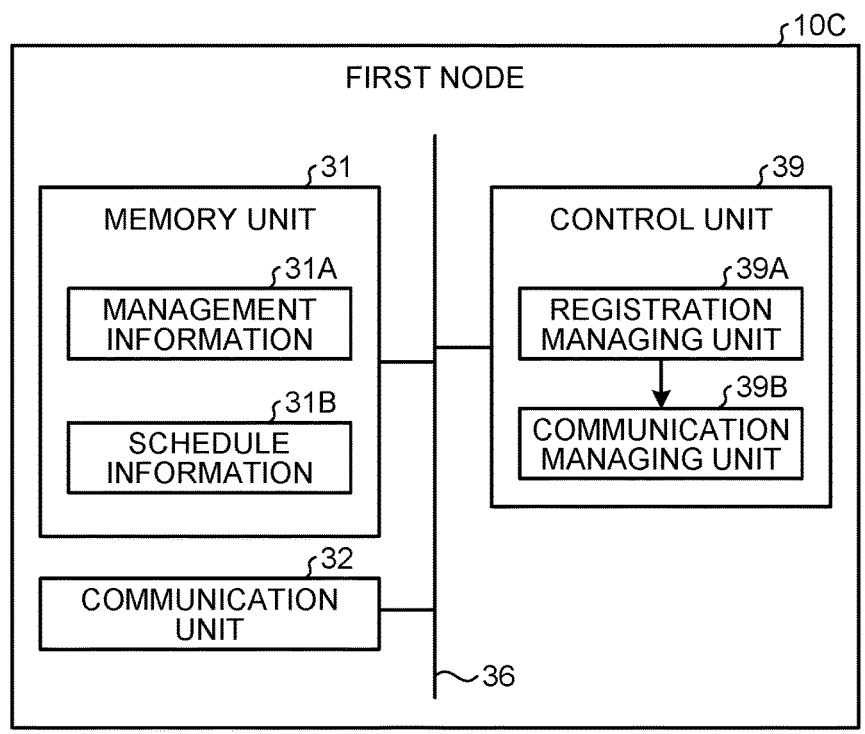
FIG. 13 is a schematic diagram illustrating a data configuration of an inspection packet.
FIG. 14 is a schematic diagram illustrating a functional configuration of a first node.

FIG. 13 is a schematic diagram illustrating an exemplary data configuration of an inspection packet sent by the communication control unit 49A.

An inspection packet includes source information, destination information, the TTL, and data. Moreover, the data field of an inspection packet includes the TTL initial value, and the transmission location information. Herein, the source information, the destination information, the TTL, and the TTL initial value are identical to the first embodiment. Thus, in the second embodiment, an inspection packet additionally includes the transmission location information.

The transmission location information indicates the location of transmission of the inspection packet. The transmission location information contains at least either the position of the GW node 10D at the time of transmitting the inspection packet or the transmission timing. The position of the GW node 10D represents the position thereof in the wireless multihop mesh network 2 at the time of transmitting the inspection packet.

Returning to the explanation with reference to FIG. 12, in an identical manner to the communication control unit 48A, the communication control unit 49A transmits an inspection packet either at regular intervals or when the TTL specified in a packet received from any first node 10C is equal to or larger than the second threshold value. At that time, the communication control unit 49A can set the transmission location information in the data field of the inspection packet, and then send the inspection packet.

Thus, except for also setting the transmission location information in an inspection packet, the communication control unit 49A performs identical operations to the operations performed by the communication control unit 48A according to the first embodiment.

In this way, in the second embodiment, the communication control unit 49A transmits an inspection packet, which also includes the transmission location information, to one first node 10C. Thus, the communication control unit 49A of the GW node 10D can send information indicating the location of transmission of an inspection packet to each first node 10C, and can notify each first node 10C about the information used in calculating the setting-purpose TTL for each position of the GW node 10D.

Moreover, in an identical manner to the communication control unit 48A according to the first embodiment, when the TTL specified in a packet received from any first node 10C is equal to or larger than the second threshold value, the communication control unit 49A unicasts, to the concerned first node 10C, an inspection packet that includes the TTL as the TTL correction value, that includes the first node being a transmission source of the packet as the destination information, and that includes information indicating unicasting.

Herein, consider a case where neither the GW node 10D nor any first node manages the position of the GW node 10D. In that case, when the GW node 10D moves to a different position within the wireless multihop mesh network 2, there are times when the position of the GW node 10D representing the destination of a packet transmitted by any first node 10C differs from the position of the GW node 10D at which the packet actually reaches. In that case, there are times when the communication control unit 49A performs erroneous determination about whether or not the TTL specified in the received packet is equal to or larger than the second threshold value.

In contrast, in the wireless communication system 1B according to the second embodiment, the communication control unit 49A transmits an inspection packet, which includes the transmission location information, to each first node 10C. Hence, the communication control unit 49A of the GW node 10D becomes able to notify each first node 10C about the information to be used in calculating the setting-purpose TTL for each position of the GW node 10D. Moreover, each first node 10C performs the operations explained later and, using the TTL initial value and the transmission location information specified in the inspection packet, manages the setting-purpose TTL, the TTL initial value, and the transmission location information for each position to which the GW node 10D moves (the detailed explanation is given later). With that, the communication control unit 49A becomes able to determine whether or not the TTL specified in the received packet is equal to or larger than the second threshold value, and thus can avoid performing erroneous determination.

Given below is the explanation of an exemplary functional configuration of the first node 10C according to the second embodiment.

FIG. 14 is a schematic diagram illustrating an exemplary functional configuration of the first node 10C.

The first node 10C includes a memory unit 31, the communication unit 32, and a control unit 39. Thus, except for the fact that the memory unit 31 is included in place of the memory unit 30 and that the control unit 39 is included in place of the control unit 38, the first node 10C is identical to the first node 10A according to the first embodiment.

The memory unit 31 is used to store management information 31A and schedule information 31B. Regarding the management information 31A and the schedule information 31B, the detailed explanation is given later.

The control unit 39 includes a registration managing unit 39A and a communication managing unit 39B. Thus, except for the fact that the registration managing unit 39A is included in place of the registration managing unit 39A and that the communication managing unit 39B is included in place of the communication managing unit 38B, the control unit 39 is identical to the control unit 38 according to the first embodiment.

In an identical manner to the registration managing unit 38A according to the first embodiment, based on an inspection packet received from the GW node 10D, the registration managing unit 39A registers the setting-purpose TTL in the management information 31A so as to have correspondence with the GWID representing the second identification information of the GW node 10D. The setting-purpose TTL to be registered corresponds to the difference between the TTL initial value and the TTL specified in the inspection packet. In the second embodiment, the registration managing unit 39A registers the setting-purpose TTL and the transmission location information in the management information 31A so as to have correspondence with the GWID. The setting-purpose TTL corresponds to the difference between the TTL initial value and the TTL specified in the inspection packet. The transmission location information is specified in the inspection packet.

FIG. 15 is a schematic diagram illustrating an exemplary data configuration of the management information 31A. The management information 31A is information in which the GWID representing the second identification information of the GW node 10D, the setting-purpose TTL, the TTL initial value, and transmission starting-point information are associated with one another. That is, the management information 31A represents information obtained by additionally registering the transmission starting-point information in the management information 30A according to the first embodiment.

In an identical manner to the registration managing unit 38A according to the first embodiment, the registration managing unit 39A calculates, as the setting-purpose TTL, the value obtained by subtracting the TTL specified in the inspection packet from the TTL initial value specified in the inspection packet. Then, the registration managing unit 39A registers, in the management information 31A, the calculated setting-purpose TTL; the GWID and the TTL initial value specified in the inspection packet used in calculating the setting-purpose TTL; and the transmission location information specified in the inspection packet, so as to have correspondence with each other. That is, the registration managing unit 39A additionally registers, in the management information 31A, the transmission location information specified in the inspection packet so as to have correspondence with the GWID.

In the second embodiment, the GW node 10D is capable of changing positions in the wireless multihop mesh network 2. Hence, in the management information 31A, with respect to a single GWID; the setting-purpose TTL, the TTL initial value, and the transmission starting-point information get registered for each position to which the GW node 10D identified by that GWID moves.

Returning to the explanation with reference to FIG. 14, in an identical manner to the communication managing unit 38B according to the first embodiment, the communication managing unit 39B sets the setting-purpose TTL, which corresponds to the GWID of the GW node 10D in the management information 31A, as the TTL of the packets addressed to the GW node 10D.

In the second embodiment, the GW node 10D included in the wireless multihop mesh network 2 is configured to be able to change positions within the wireless multihop mesh network 2.

In that regard, the communication managing unit 39B refers to the schedule information 31B and refers to the transmission location information specified in the inspection packet, identifies the position of the GW node 10D at the time of transmitting the inspection packet.

The schedule information 31B is stored in advance in the memory unit 31.

FIG. 16 is a schematic diagram illustrating an exemplary data configuration of the schedule information 31B. The schedule information 31B is information in which the GWID and the location information are associated with each other.

The location information indicates the position of the GW node 10D at a particular timing. The location information contains timing information and position information.

The timing information specified in the location information indicates the timing at which the GW node 10D is present at the corresponding position in the wireless multihop mesh network 2. The timing information can be information indicating a single timing or can be information indicating a predetermined period of time.

The position information specified in the location information indicates the position of the GW node 10D in the wireless multihop mesh network 2 at which the GW node 10D is supposed to be present at the timing indicated by the corresponding timing information.

In the second embodiment, the GW node 10D is capable of changing positions within the wireless multihop mesh network 2. Hence, in the schedule information 31B, one or more pieces of location information are registered in advance so as to have correspondence with a single GWID.

Returning to the explanation with reference to FIG. 14, the communication managing unit 39B identifies, in the schedule information 31B, the location information that contains the timing information of the scheduled-transmission timing corresponding to the GWID of the GW node 10D representing the destination.

More specifically, the communication managing unit 38B identifies the GWID of the GW node 10D representing the destination and identifies the scheduled-transmission timing of the packets. Then, in the schedule information 31B, the communication managing unit 38B identifies the location information that, from among the pieces of location information corresponding to the GWID of the GW node 10D representing the destination, contains the scheduled-transmission timing as the timing information. As a result of performing such operations, the communication managing unit 38B identifies the position of the GW node 10D, which represents the destination, in the wireless multihop mesh network 2 at the time of transmitting the packets.

Then, the communication managing unit 39B identifies, in the management information 31A, the setting-purpose TTL corresponding to the transmission location information indicating the identified location information.

More specifically, the communication managing unit 39B identifies, from among pieces of transmission location information corresponding to the GWID of the GW node 10D representing the destination in the management information 31A, transmission location information that contains information indicating the transmission timing matching with the timing information specified in the identified location information, or transmission location information that is included in the transmission timing or contains information indicating the position matching with the position information included in the identified location information. Then, the communication managing unit 39B identifies, in the management information 31A, the setting-purpose TTL corresponding to the identified transmission location information.

Then, the communication managing unit 39B sets the identified setting-purpose TTL as the TTL of the packets addressed to the GW node 10D, and then transmits the packets.

As explained above, in the second embodiment, an inspection packet includes the GWID (second identification information), the TTL initial value, the TTL, and the transmission location information containing at least either the position of the GW node 10D at the time of transmitting an inspection packet or the transmission timing. The registration managing unit 39A of each first node 10C registers the setting-purpose TTL in the management information 31A to have correspondence with the GWID. The setting-purpose TTL to be registered corresponds to the difference between the TTL initial value and the TTL specified in the inspection packet; and the transmission location information specified in the inspection packet. The communication managing unit 39B identifies, in the schedule information 31B, the location information that contains the timing information of the scheduled-transmission timing corresponding to the GWID of the GW node 10D representing the destination; sets the setting-purpose TTL, which corresponds to the transmission location information indicating the identified location information in the management information 31A, as the TTL of the packets addressed to the GW node 10D; and then transmits the packets.

Hence, in the second embodiment, the wireless communication system 1 according to the first embodiment can be implemented in the wireless multihop mesh network 2 that contains the GW node 10D capable of changing the positions.

First Modification Example

In the embodiments described above, the explanation is given about an example that Bluetooth Mesh explained in Nonpatent Literature 1 mentioned above is used as the standard specification for the wireless multihop mesh network 2. However, as long as flooding communication can be used, the standard specification of the wireless multihop mesh network 2 is not limited to Bluetooth Mesh. For example, RPL (IPv6 Routing Protocol for Low power and Lossy Network) or ZigBee (registered trademark) can be used as the standard specification for the wireless multihop mesh network 2.

Second Modification Example

In the first embodiment described earlier, the explanation is given about an example that the registration managing unit 38A of each first node 10A calculates, as the setting-purpose TTL, the difference between the TTL initial value specified in an inspection packet and the TTL specified in the inspection packet. More specifically, the explanation is given about an example that the registration managing unit 38A calculates, as the setting-purpose TTL, the value obtained by subtracting the TTL specified in the inspection packet from the TTL initial value specified in the inspection packet.

Alternatively, the registration managing unit 38A can calculate, as the setting-purpose TTL, a value that corresponds to the difference between the TTL initial value and the TTL specified in the inspection packet.

For example, the registration managing unit 38A can register, as the setting-purpose TTL corresponding to the GWID in the management information 30A, the value obtained by adding a predetermined buffer value to the value obtained by subtracting the TTL specified in the inspection packet from the TTL initial value specified in the inspection packet.

Thus, the registration managing unit 38A can calculate the setting-purpose TTL using Equation (2) given below.

$$TTLm = Ti - \max Tm + \alpha \quad (2)$$

In Equation (2), TTLm, Ti, Tm, and maxTm are the same as those in Equation (1) given earlier. Moreover, α represents a buffer value.

The buffer value can be set in advance according to the network topology of the wireless multihop mesh network 2. Moreover, the buffer value can be set to be variable according to an operation instruction issued by the user.

When there is instability in the link quality of the wireless multihop mesh network 2 or when there is frequent transmission of packets in the wireless multihop mesh network 2, sometimes it is difficult for the packets from the first nodes 10A to reach the GW nodes 10B via the shortest routes. In that regard, if the value obtained by adding a predetermined buffer value to the value obtained by subtracting the TTL specified in the inspection packet from the TTL initial value specified in the inspection packet as the setting-purpose TTL, the registration managing unit 38A becomes able to provide some margin in the setting-purpose TTL.

Hence, when a value including a buffer value is used as the setting-purpose TTL, it becomes possible to achieve redundancy of the routes.

Given below is the explanation of an exemplary hardware configuration of the node 10 according to the embodiments described above.

Figure 17:
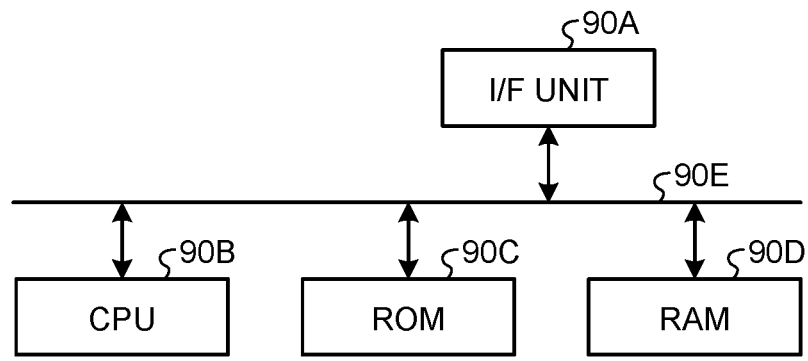
FIG. 17 is a hardware configuration diagram.

FIG. 17 is an exemplary hardware configuration diagram of the node 10 according to the embodiments described above.

The node 10 according to the embodiments described above has the hardware configuration of a general-purpose computer that includes a control device such as a central processing unit (CPU) 90B; memory devices such as a read only memory (ROM) 90C and a random access memory (RAM) 90D; an OF unit 90A representing the interface for various devices; and a bus 90E that connects the constituent elements to each other.

In the node 10 according to the embodiments described above, the CPU 90B reads a computer program from the ROM 90C into the RAM 90D, and executes the computer program so that the function units get implemented in the computer.

Meanwhile, the computer program meant for implementing the operations performed in the node 10 according to the embodiments described above can be stored in advance in the ROM 90C.

Alternatively, the computer program meant for implementing the operations performed in the node 10 according to the embodiments described above can be stored as an installable file or an executable file in a computer-readable memory medium such as a compact disc read only memory (CD-ROM), a compact disc recordable (CD-R), a digital versatile disc (DVD), or a flexible disk (FD); and can be provided as a computer program product. Still alternatively, the computer program meant for implementing the operations performed in the node 10 according to the embodiments described above can be stored in a downloadable manner in a computer connected to a network such as the Internet. Still alternatively, the computer program meant for implementing the operations performed in the node 10 according to the embodiments described above can be distributed via a network such as the Internet.

While certain embodiments have been described, these embodiments have been presented by way of example only, and are not intended to limit the scope of the inventions. Indeed, the novel embodiments described herein may be embodied in a variety of other forms; moreover, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A wireless communication system comprising:
 a first wireless communication device constituting a wireless multihop mesh network and performing flooding communication; and
 a second wireless communication device constituting the wireless multihop mesh network and being capable of communicating with an external network, wherein
 the first wireless communication device includes one or more hardware processors coupled to a memory, the one or more hardware processors are configured to:
   register a setting-purpose TTL (Time To Live) in management information on the basis of an inspection packet received from the second wireless communication device, the inspection packet including second identification information of the second wireless communication device, a TTL initial value, and a TTL, the setting-purpose TTL corresponding to difference between the TTL initial value and the TTL included in the inspection packet, the setting-purpose TTL being registered to have correspondence with the second identification information;
   set the setting-purpose TTL as a TTL of a packet addressed to the second wireless communication device identified by the second identification information, the setting-purpose TTL corresponding to the second identification information in the management information; and transmit the packet for which the setting-purpose TTL has been set as the TTL.

2. The wireless communication system according to claim 1, wherein the one or more hardware processors are configured to register the setting-purpose TTL in the management information to have correspondence with the second identification information, the setting-purpose TTL corresponding to difference between the TTL initial value and a maximum TTL value out of TTLs specified in a plurality of inspection packets received from the second wireless communication device.

3. The wireless communication system according to claim 1, wherein, when destination information specified in the inspection packet indicates broadcasting, the one or more hardware processors are configured to register the setting-purpose TTL in the management information, the setting-purpose TTL corresponding to difference between the TTL initial value and the TTL specified in the inspection packet.

4. The wireless communication system according to claim 1, wherein, when destination information specified in the inspection packet indicates unicasting and indicates another second wireless communication device, the one or more hardware processors are configured to determine whether or not difference between a TTL initial value specified in the inspection packet received at a previous time from the second wireless communication device and a TTL specified in the inspection packet received at a current time is equal to or larger than a first threshold value, and, in response to determining that the difference is equal to or larger than the first threshold value, register the difference as the setting-purpose TTL in the management information to have correspondence with the second identification information.

5. The wireless communication system according to claim 1, wherein the second wireless communication device is capable of changing position within the wireless multihop mesh network, the inspection packet includes the second identification information, the TTL initial value, the TTL, and transmission location information containing a transmission timing and/or the position of the second wireless communication device at a time of transmitting the inspection packet, and the one or more hardware processors of the first wireless communication device are configured to:

register the setting-purpose TTL and the transmission location information in the management information to have correspondence with the second identification information, the setting-purpose TTL corresponding to difference between the TTL initial value and the TTL specified in the inspection packet, the transmission location information being specified in the inspection packet;

identify location information from schedule information, the schedule information being information in which the second identification information of the second wireless communication device is associated in advance with location information, the location information containing timing information and position information of the position at which the second wireless communication device is scheduled to be present at a timing indicated by the timing information, the location information to be identified containing the timing information of scheduled-transmission timing corresponding to the second identification information of the second wireless communication device representing destination;

set the setting-purpose TTL corresponding to the transmission location information indicating the identified location information in the management information, as a TTL of the packet addressed to the second wireless communication device; and transmit the packet for which the setting-purpose TTL has been set as the TTL.

6. A wireless communication device constituting a wireless multihop mesh network and performing flooding communication, the wireless communication device comprising:

one or more hardware processors coupled to a memory, the one or more hardware processors are configured to:

register a setting-purpose TTL (Time To Live) in management information on the basis of an inspection packet received from a second wireless communication device constituting the wireless multihop mesh network and being capable of communicating with an external network, the inspection packet including second identification information of the second wireless communication device, a TTL initial value, and a TTL, the setting-purpose TTL corresponding to difference between the TTL initial value and the TTL included in the inspection packet, the setting-purpose TTL being registered to have correspondence with the second identification information;

set the setting-purpose TTL as a TTL of a packet addressed to the second wireless communication device identified by the second identification information, the setting-purpose TTL corresponding to the second identification information in the management information; and transmit the packet for which the setting-purpose TTL has been set as the TTL.

7. A wireless communication method implemented by a wireless communication device constituting a wireless multihop mesh network and performing flooding communication, the wireless communication method comprising:

registering a setting-purpose TTL (Time To Live) in management information on the basis of an inspection packet received from a second wireless communication device constituting the wireless multihop mesh network and being capable of communicating with an external network, the inspection packet including second identification information of the second wireless communication device, a TTL initial value, and a TTL, the setting-purpose TTL corresponding to difference between the TTL initial value and the TTL included in the inspection packet, the setting-purpose TTL being registered to have correspondence with the second identification information;

setting the setting-purpose TTL as a TTL of a packet addressed to the second wireless communication device identified by the second identification information, the setting-purpose TTL corresponding to the second identification information in the management information; and transmitting the packet for which the setting-purpose TTL has been set as the TTL.

8. A computer program product comprising a non-transitory computer-readable recording medium on which a computer program executable by a computer is recorded, the computer constituting a wireless multihop mesh network and performing flooding communication, the computer program instructing the computer to:

register a setting-purpose TTL (Time To Live) in management information on the basis of an inspection packet received from a second wireless communication device constituting the wireless multihop mesh network and being capable of communicating with an external network, the inspection packet including second identification information of the second wireless communication device, a TTL initial value, and a TTL, the setting-purpose TTL corresponding to difference between the TTL initial value and the TTL included in the inspection packet, the setting-purpose TTL being registered to have correspondence with the second identification information;

set the setting-purpose TTL as a TTL of a packet addressed to the second wireless communication device identified by the second identification information, the setting-purpose TTL corresponding to the second identification information in the management information; and transmit the packet for which the setting-purpose TTL has been set as the TTL.

* * * * *